United States Patent [19]
White

[11] Patent Number: 5,947,538
[45] Date of Patent: Sep. 7, 1999

[54] IMPACT ABSORBING APPARATUS

[75] Inventor: Donald J. White, Russellville, Ark.

[73] Assignee: Sail D White Ents. Inc., Russellville, Ark.

[21] Appl. No.: 09/065,688

[22] Filed: Apr. 22, 1997

Related U.S. Application Data

[63] Continuation-in-part of application No. 08/795,255, Feb. 10, 1997, Pat. No. 5,788,186.

[51] Int. Cl.$^6$ ..................................................... B60R 19/30
[52] U.S. Cl. ............................................ 293/135; 293/136
[58] Field of Search .................................... 293/102, 131, 293/132, 135, 136; 213/220, 221, 222

[56] References Cited

U.S. PATENT DOCUMENTS

| | | | |
|---|---|---|---|
| 4,022,451 | 5/1977 | Voight | 267/116 |
| 4,079,926 | 3/1978 | Nanes | 267/176 |
| 4,085,832 | 4/1978 | Gaines et al. | 188/268 |
| 4,403,674 | 9/1983 | Viall, Sr. et al. | 293/5 X |
| 4,441,751 | 4/1984 | Wesley | 296/1 S |
| 4,514,002 | 4/1985 | McIntosh | 293/118 |
| 4,929,008 | 5/1990 | Esfandiary | 293/108 |
| 5,106,137 | 4/1992 | Curtis | 293/107 |

FOREIGN PATENT DOCUMENTS

| 2162412 | 6/1973 | Germany | 293/132 |
|---|---|---|---|

OTHER PUBLICATIONS

Alpha 70k TMA (Form #ENE 590—Jan. 1996.) Energy Absorption Systems, Inc.
Alpha 100k TMA (Form #ENE591—Mar. 1997) Energy Absorption Systems, Inc.
The Alpha 1000 TMA (form #ENE742–891). Energy Absorption Systems, Inc.

*Primary Examiner*—D. Glenn Dayoan
*Assistant Examiner*—Chad D Wells
*Attorney, Agent, or Firm*—Stephen D. Carver

[57] ABSTRACT

An impact absorbing device, preferably for trucks, attenuates the impact of colliding vehicles. A rigid mount secures the apparatus to the truck rear underside. A rigid chassis is suspended from the mount. An impact absorbing bumper exposed for contact at the truck rear controls a displaceable ram that is slidably captivated by the chassis. A wound band assembly suspended beneath the chassis is activated by displacement of the ram. The wound band assembly connects to suitable levers on each side of the chassis that interconnect it with shock absorbers. Energy is dissipated in the shock absorbers over a predetermined compression deflection. This distance is substantially less than the travel distance of the ram, and the mechanical advantage reduction is provided by the combination of the levers and the wound band assembly. When the bumper is forcibly impacted, the ram accelerates longitudinally, tightening the wound band assembly and compressing the shock absorbers through the levers. The shock absorbers are fitted with a plurality of unload restraint assemblies that prevent the impact absorbing apparatus from rebounding to its original state after an impact. The apparatus has a further safety lock to contain the apparatus in a compressed state after an impact until the device can be safely decompressed. This rebound preventer ratcheting dog locks the bumper in its compacted state.

20 Claims, 9 Drawing Sheets

IMPACT ABSORBING APPARATUS

CROSS-REFERENCE TO RELATED APPLICATION

This application is a Continuation-In-Part of a U.S. patent application filed on Feb. 10, 1997, Ser. No. 08/795,255, now U.S. Pat. No. 5,788,186 entitled HELICOPTER LOAD SUSPENDING APPARATUS, Examiner V. Mojica. G.A.U. 3613.

BACKGROUND OF THE INVENTION

I. Field of the Invention

The present invention relates generally to impact absorbing, load decelerating devices. More specifically, the invention relates to a load decelerating or impact damping or absorbing device that is primarily oriented horizontally for absorbing impact forces at the rear of a truck trailer.

II. Description of the Prior Art

Shock absorber or impact dissipating devices are used to dissipate the considerable forces engendered by colliding masses. If the shock absorber is too small or large, a potentially damaging impact spike can occur. On the other hand, on some high efficiency designs, if the speed is too high, (or too low) deceleration efficiency is lost and safety must be sacrificed, subjecting the protected vehicle/craft to greater risks from undesirable breakage, collapse, stress and the like.

As will be recognized by those skilled in the art, shock absorbers and other load decelerating devices decelerate masses and reduce kinetic energy through displacement. Low velocity air drop means were originally developed by the military to quickly transport important materials in combat situations. They continue to be used extensively by several segments of the military for these job duties.

Typical low velocity air drop devices carry their loads on cables or "slings" extending between the load and the free-fall arresting means. An obvious and significant advantage of parachutes over other conventional delivery means is their mobility and reduced speed at impact. For example, when troops touch ground they intentionally fall in a way so as to dissipate the force of the impact over time and distance. Likewise, equipment/cargo is sometimes placed on a collapsible pallet to do the same thing. Devices and methods that dissipate impact energy in "vertical" applications such as air drops also have relevance in "horizontal" applications, such as crash protection and the like.

For example, force impact resistant systems are in widespread use with automobiles. A problem associated with energy absorbing bumpers involves movement during impact. The effectiveness of known cost-effective impact dissipation systems is reduced non linearly in response to vehicle speed. Many impact resistant bumpers are of little benefit at speeds over five miles an hour. At highway speeds known impact dissipating systems fail to prevent catastrophic collapse and resultant personal injury. Such collapse may result in load jettisoning or the total loss of vehicle structural integrity. Obviously occupant safety is sacrificed as well.

A wide variety of crash attenuators have been used to decelerate an impacting vehicle which has left the highway, including attenuators based on dispersible inertial materials such as sand, valved fluids such as water, disintegrating materials such as vermiculite, and buckling columns. These previous embodiments of impact attenuating devices adapted to be mounted on a vehicle have generally been of the type comprising an energy absorbing element and a mounting arrangement coupled to the energy absorbing element and configured to mount the energy element on the vehicle. These devices are often referred to in the industry as a truck mounted attenuator or TMA and are typically mounted on the rear of the vehicle. These prior art TMAs are generally large box like structures containing the energy absorbing material and extend out from the rear of the mounting vehicle. These prior TMAs are large and unsuitable for general use on a vehicle operating at normal highway speeds.

Due to new safety requirements imposed on the commercial tractor trailer manufacturers, there are recognized opportunities to make improvements to the rear bumpers of large over the road trailers to provide protection to the occupants vehicles involved in rear end collisions with these trailers. In looking at these opportunities we recognize some basic requirements for the acceptance of new and innovative approaches. These include: Cost comparable to savings or benefit; Reduction in predictable injuries, (both from under ride prevention and from impact forces transposed to the vehicle occupants); and Acceptance by the Regulators and Documentation of Benefit.

U.S. Pat. No. 5,106,137 deals with a gas in response to vehicle impact. U.S. Pat. No. 4,085,832 deals with a plurality of axially aligned chambers. Whereas mine would have different stress density stages, but would also have an anti-rebound means for use with elastic absorbers. U.S. Pat. No. 4,079,926 shows a composite coil providing a means of preloading the coil. U.S. Pat. No. 4,022,451 deals with an impact damping system with a progressively tighter fit as it telescopes. U.S. Pat. No. 4,441,751 deals with a device that substantially protrudes from a vehicle to provide a cushion against the shock of impact. U.S. Pat. No. 4,929,008 shows staged impact absorbing means of friction against slotted bolted surfaces and an inflatable block. U.S. Pat. No. 4,514,002 shows a two position bumper, whereas my present invention shows a substantially fixed position bumper with a designated path to retract with impact and remain captured, following severe impact until gradually released by personnel following a procedure.

Using the three plane motion in my helicopter device as a contemplated means to allow impact strikes in a slightly offset direction would be applicable in more sophisticated applications (such as air drop to irregular terrain).

The known prior art does not adequately address the need for an efficient, quick operating, shock absorbing suspension stabilizer for this range of speed. While the prior art includes systems for decelerating a mass, known systems do not intentionally shift the mechanical advantage of the shock absorbing apparatus. Prior art devices do not resist the impact while progressively retracting due to impact to absorb the energy of high speed collisions while limiting the travel distance to that beyond which passenger compartment intrusion injuries could occur.

SUMMARY OF THE INVENTION

My preferred deceleration device mounts to the trailer rear bumper. When rear-end collisions occur, it decelerates the colliding mass gradually by increasing the impact absorption time and distance. Deployment of the deceleration device affects the device dynamics to achieve a smoother stop. Preferably, the deceleration device mounts on supporting structures fixed to the trailer underside at its extreme rear. A bumper height is established to ideally match with the bumper height of the predictable colliding vehicle.

The bumper clears the trailer axle and undercarriage whether the trailer is loaded or not.

My invention provides impact absorbing apparatus that can handle a higher range of impact velocities than can the prior art. A "block and tackle mechanical advantage" is provided by a wound band assembly that converts the high velocity shock forces impacting the bumper to a lower velocity forces dampened by a shock absorber system. The conversion technique enables the system to use common, available shock absorbers now on the market, as it functions adequately within the limited range of motion of production shock absorbers.

The wound band assembly comprises a resilient band that is wound about a number of pulleys. When the rear bumper is impacted, a rod projecting from it is deflected to actuate the wound band assembly, dissipating considerable energy. The band restricts horizontal movements during the time period between impact and full deflection. During impact, the band's pulley will be retracted in a plane toward the lower ends of the shock absorbers to which it connects. These shocks compress to dissipate energy, but their compression deflection is much less than the deflection distance the rear bumper travels when impacted. A series of pulleys in a block and tackle arrangement coupled to suitable levers reduce the impact travel deflection to the limited distance the shock absorbers compress when absorbing energy. Preferably, the band may have a few feet of travel to permit load or vehicle deceleration over a greater distance.

Thus a basic object is to provide an impact absorbing or load decelerating apparatus for a variety of uses.

Another fundamental object of the present invention is to provide a load decelerating apparatus that selectively deploys to move the point of impact of the transported load or vehicle prior to and during momentum changes.

Another basic object of the present invention is to provide a load decelerating apparatus that effectively moves the shock absorbers at a slower rate than the velocities of the colliding or interfering masses.

A further object is to attenuate the effects of impact by adjusting the deceleration time and deceleration distance.

A more basic object of the present invention is to provide a load deceleration device that reduces undesirable load damage or injury to passengers as a result of frontal impact.

A related object is to provide a deceleration absorbing device of the character described for use on rail cars. It is a feature of my device that it may be self-contained on a separate rail car.

Another basic object of the invention is to simplify restoration of previously collided vehicles by replacement of components.

A related object is to provide a shock absorber device that quickly decelerates a mass.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
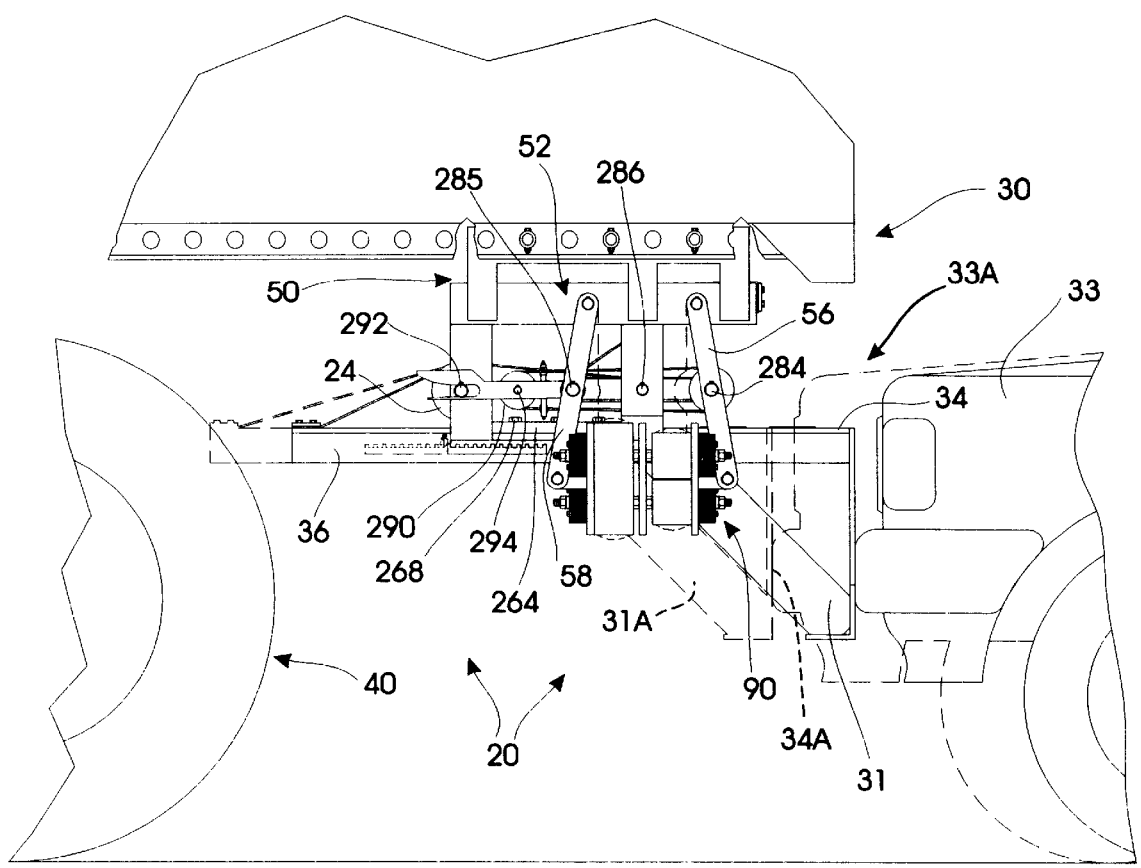
FIG. 1 is a partially fragmented environmental view of the preferred embodiment of the invention mounted in conjunction with a trailer rear bumper.
Figure 10:
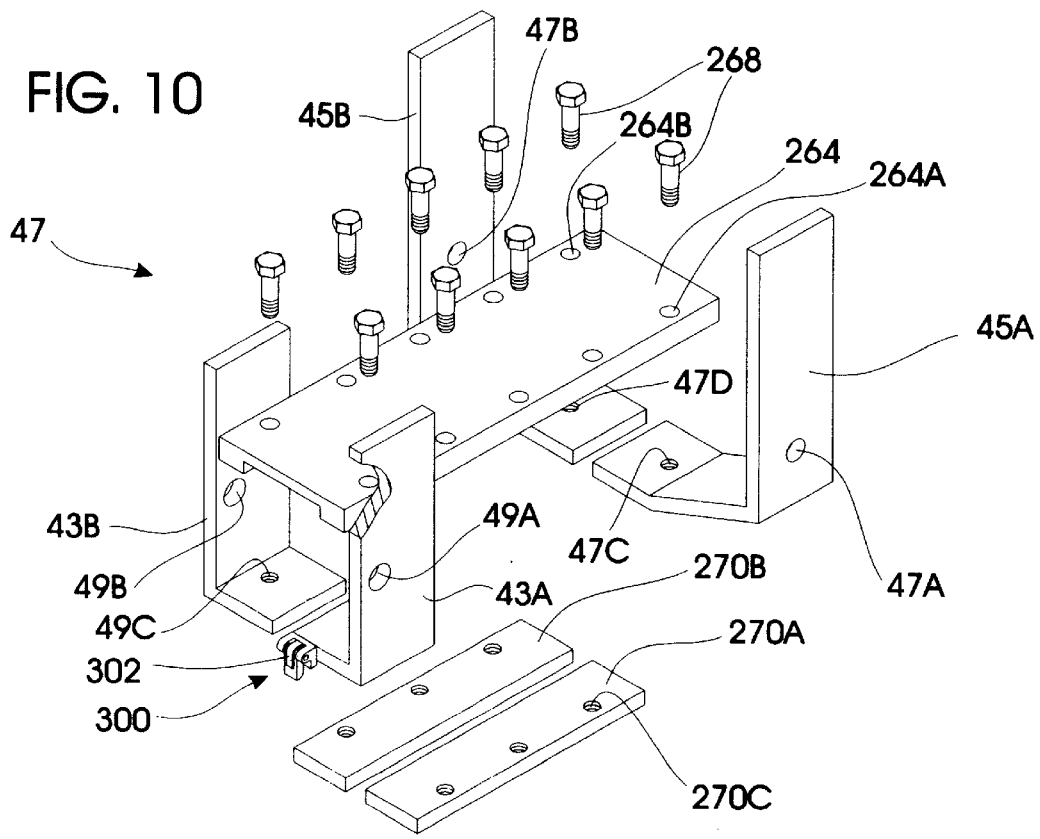
FIG. 10 is an exploded isometric view of the ram slide assembly with parts cut away or omitted for clarity; and, FIG. 11 is a fragmentary isometric view of the trailer bumper and ram assembly.
Figure 11:
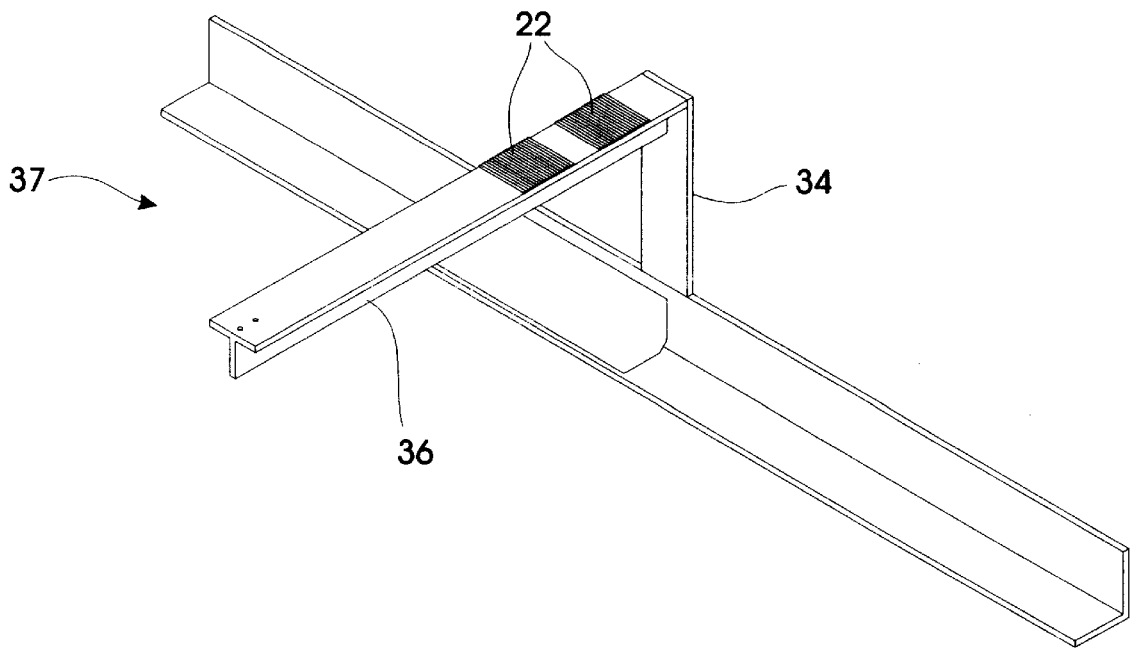

Referring more specifically to the drawings, impact absorbing apparatus for trailer under-ride prevention is broadly designated by the number 20 (FIG. 1). With attention initially directed to FIGS. 1 and 2, an impact absorbing apparatus 20 adapted to be mounted underneath a trailer 30 is shown. The apparatus 20 comprises a custom mounting means 50 that is fitted to the underside of a trailer 30. A rigid chassis 91 is affixed to the custom mounting means 50. A slide assembly 47 (FIG. 10) is suspended from the chassis 91 and slidably captivates a longitudinally displaceable ram assembly 37 (FIG. 11). The ram assembly comprises a ram 36 and an impact absorbing bumper 34. The impact absorbing bumper 34 is exposed for contact at the rear of the trailer 30 (FIG. 1) and is securely mounted to the ram 36.

Figure 3:
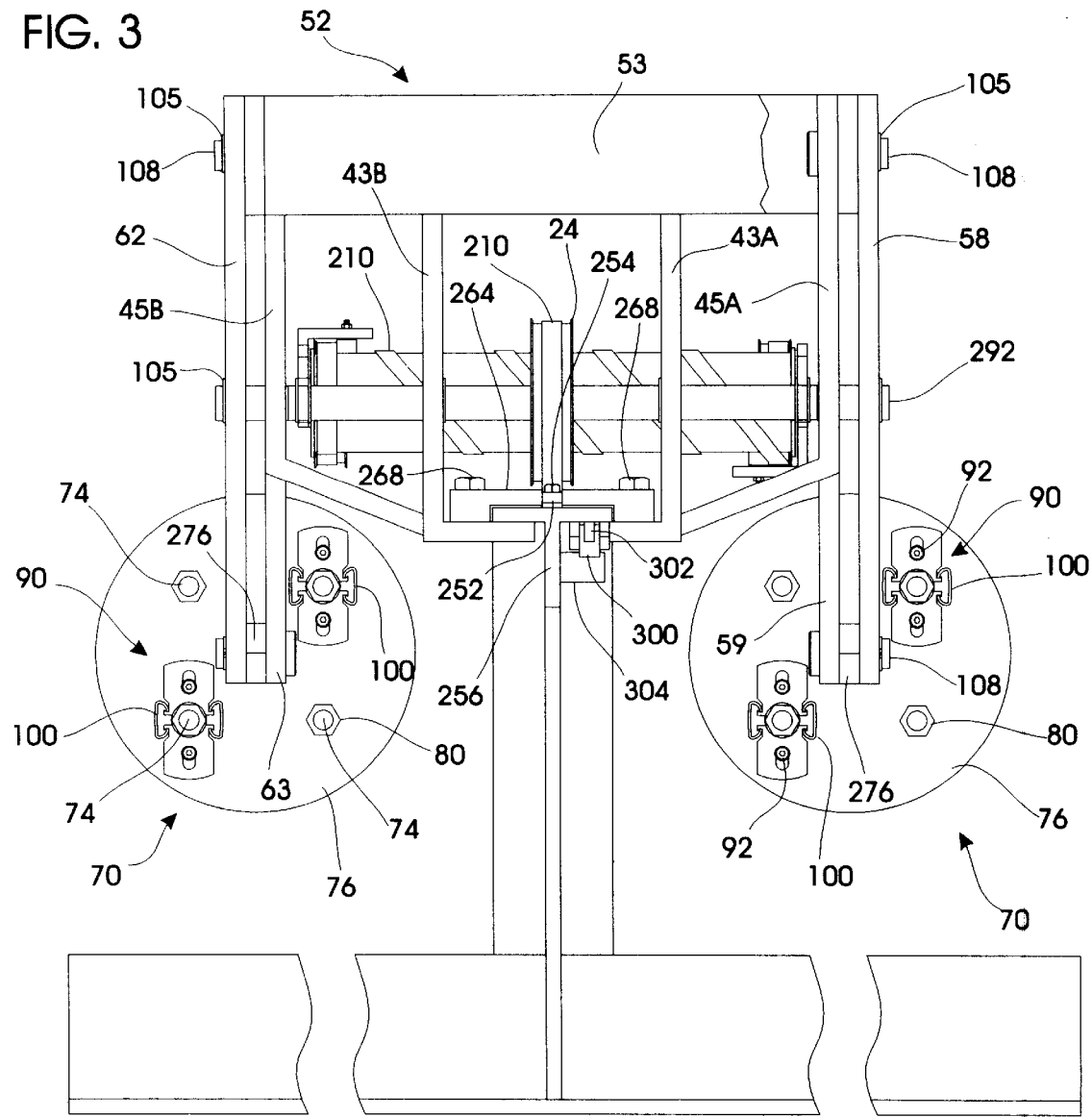
FIG. 3 is a partially fragmented rear elevational view.
Figure 4:
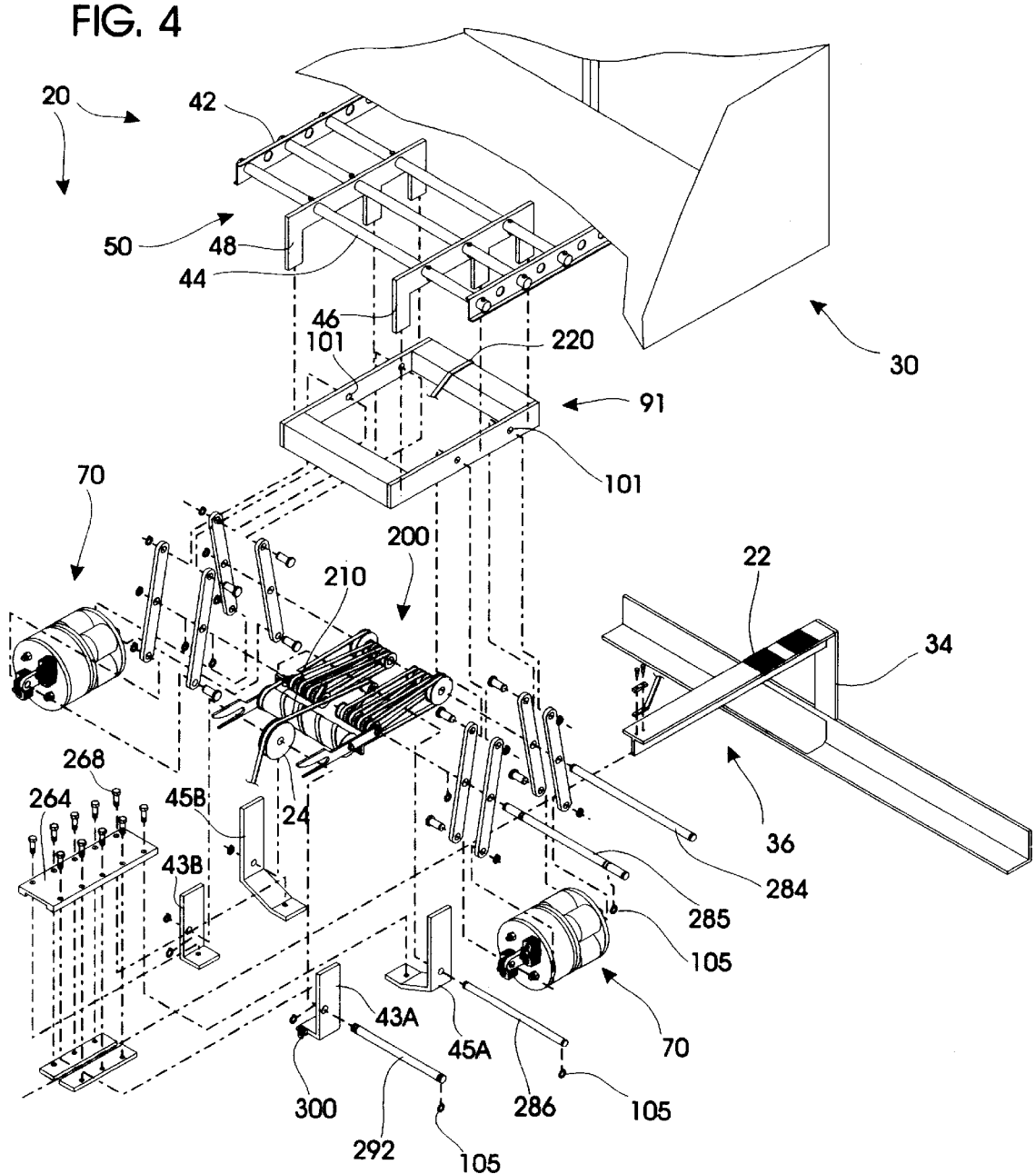
FIG. 4 is an exploded isometric view of the invention, with portions broken away or shown partially in section for clarity.
Figure 5:
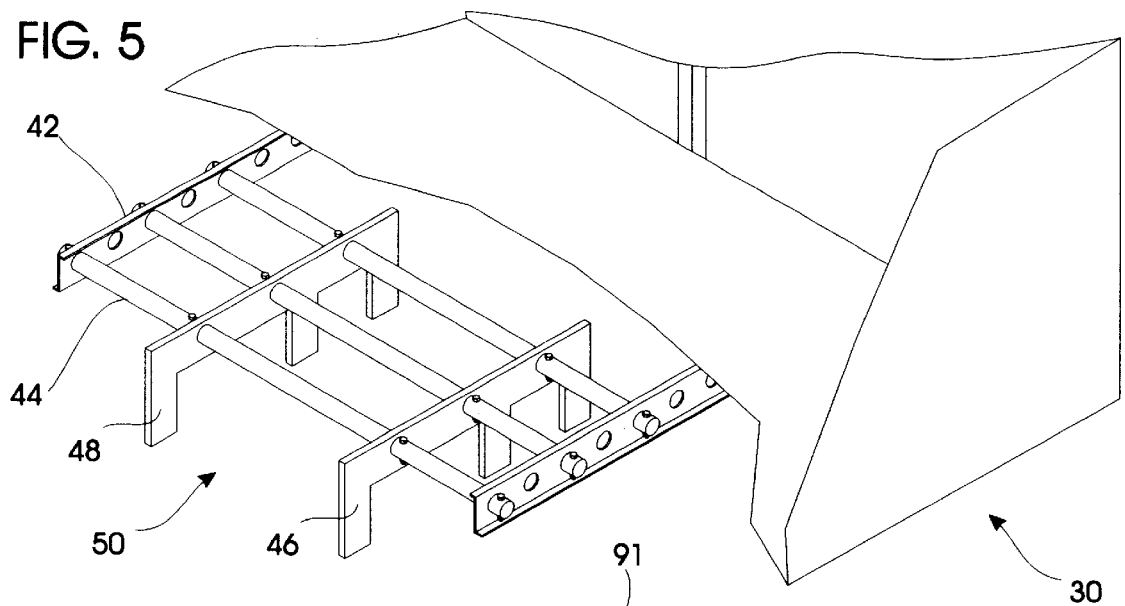
FIG. 5 is a fragmentary, exploded isometric view of a preferred custom bracket mounting means.
Figure 6:
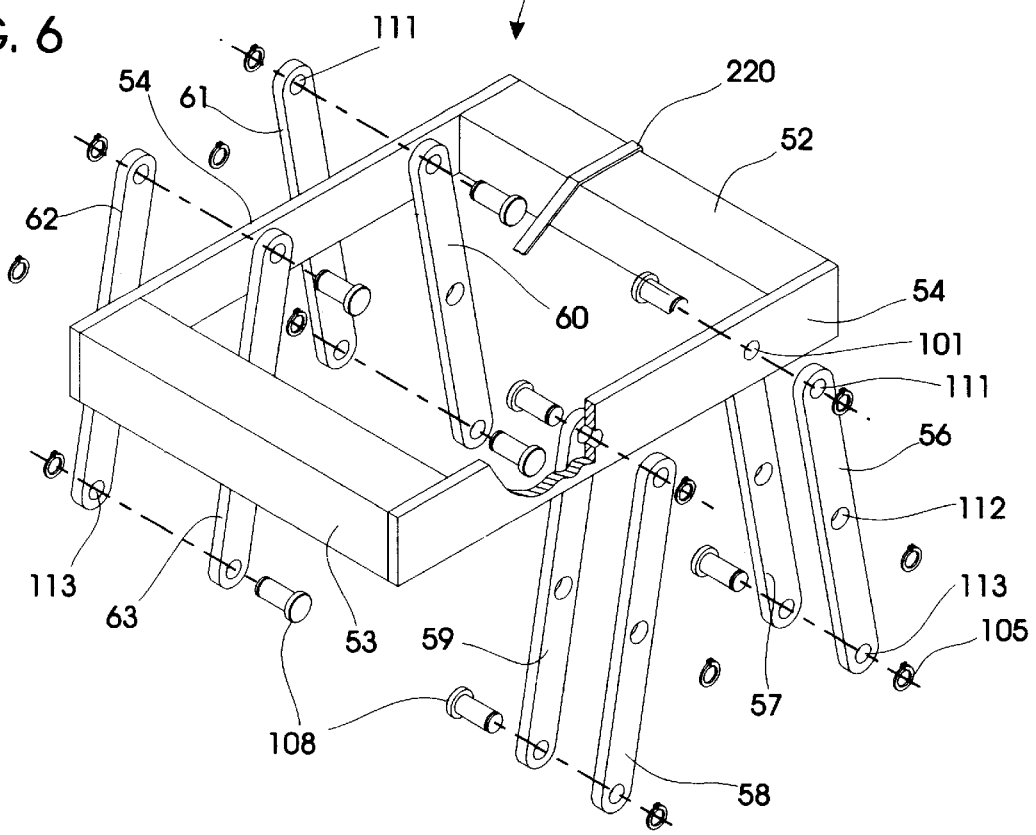
FIG. 6 is a fragmentary, exploded isometric view of the chassis means.

A wound band assembly 200 (FIG. 2) is disposed beneath the chassis 91 and is dynamically coupled to the slide assembly 47. Lever means 56, 57, 58, 59, 60, 61, 62, and 63 (FIGS. 4, 6) hang downwardly at each side of the chassis 91, each lever means having top ends pivotally coupled to the chassis 91, intermediate portions adapted to be pivotally coupled to the wound band assembly 200, and end portions hanging downwardly. Shock absorber means 70 (FIGS. 3, 8) are disposed at each side of the chassis 91 and are pivotally connected to and between the end portions of the lever means. The lever means provide a mechanical advantage reduction in conjunction with the band assembly, as the shock absorbers have only a limited range of deflection in which energy may be dampened.

The custom mounting means 50 generally comprises a rigid brace 42 that is penetrated by a plurality of orifices adapted to receive and secure several support rods 44. Mounting means 50 further comprises a pair of spaced apart attachment braces 46 with downwardly projecting tabs 48 (FIG. 4) for securely affixing a chassis 91 (FIG. 6) to the mounting means 50.

The chassis 91 (FIG. 6) is generally rectangular comprising a pair of parallel sides 54 and a front 53 and a rear 52. The parallel sides 54 are penetrated by attachment orifices 101 to allow the attachment of the upper end of the lever means 56–63. The lever means 56–63 are pivotally affixed to the chassis 91 by pin 108 and ring clamp 105 which are inserted through attachment orifices 101 and the lever means upper end mounting orifice 111. An end plate 220 is secured to the rear 52 of the chassis 91 with standard mounting hardware 221 for receiving and binding the stationary end of an elongated band 210 with standard mounting hardware 221.

Figure 8:
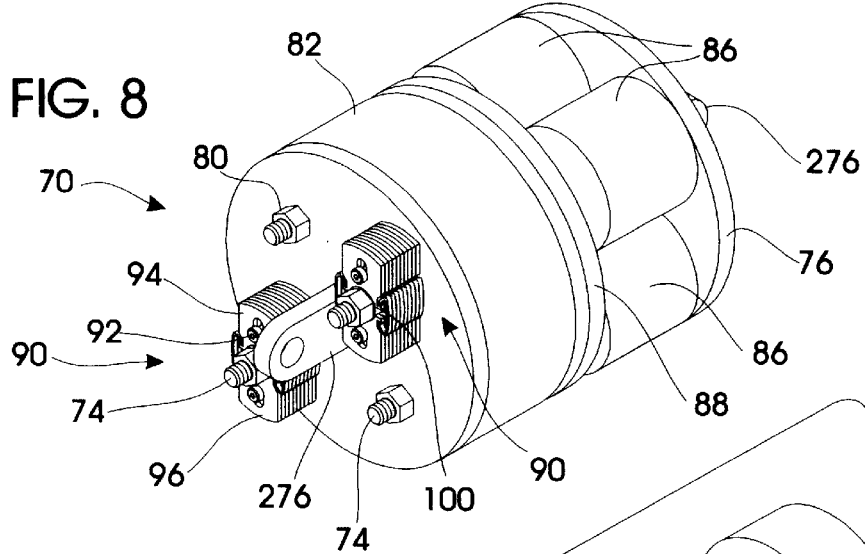
FIG. 8 is an isometric view of a progressive shock absorber assembly with unload restraint assemblies.
Figure 9:
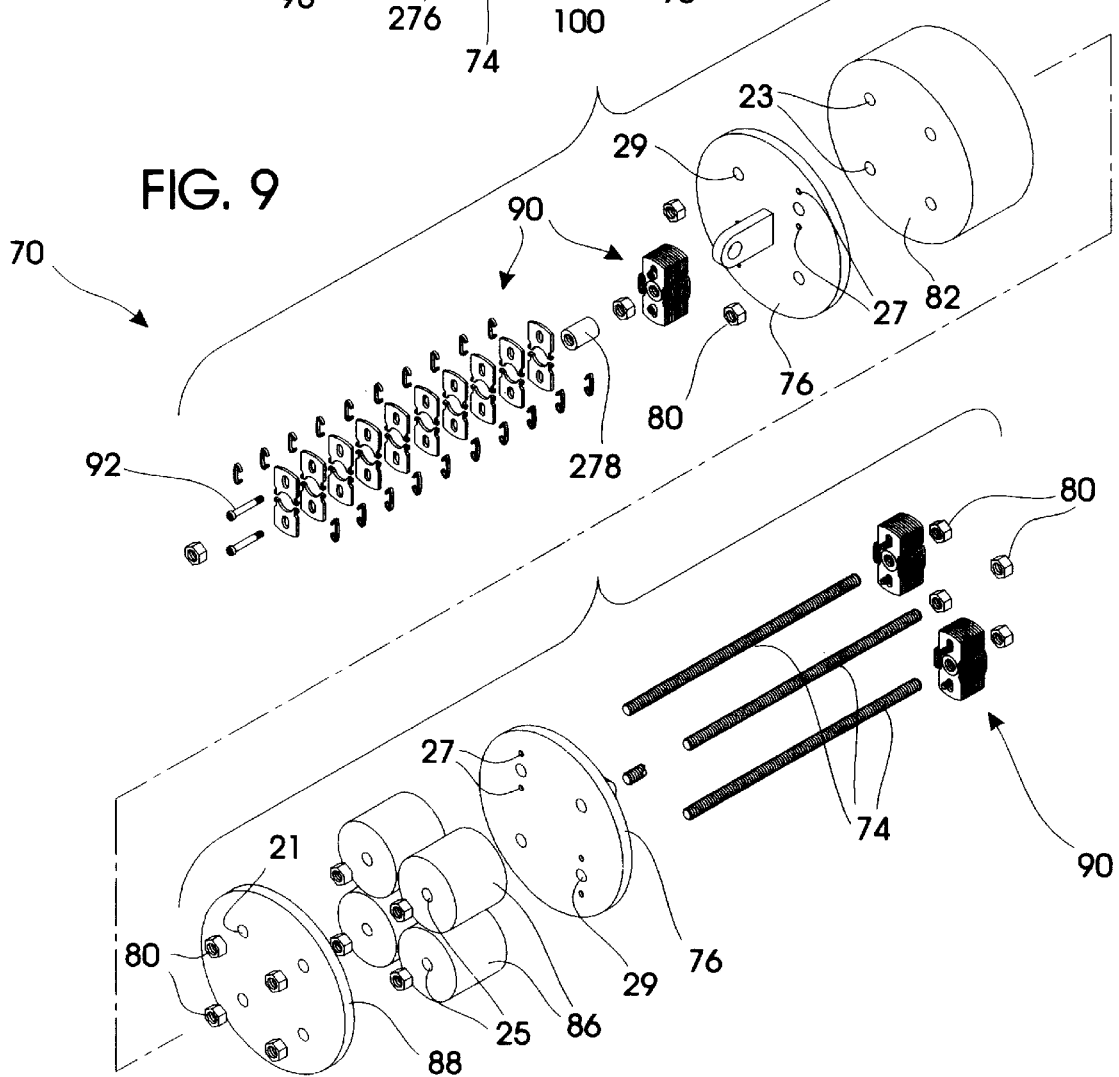
FIG. 9 is an exploded isometric view of the progressive shock absorber assembly.

Captured and pinned at the lower end hole terminals 113 of the lever means 56–63 are the progressive shock absorber assemblies 70 with locking means 90 (FIG. 8). The progressive shock absorber assembly 70 is shown in greater detail (FIG. 9). The absorber tensioning bolts 74 are respectively secured at the progressive shock absorber intermediate plate 88 (FIG. 9) through progressive shock absorber intermediate plate opening 21 with nuts 80. These absorber tensioning bolts 74 extend through stages of the absorber in opposite directions. On one side is the large area absorber elastic material 82 with assembly orifices 23 and on the other side is the small area absorber elastic material 86 with assembly orifices 25. Outboard of each area absorber elastic material and fed onto the absorber tensioning bolts are the plates 76 with tangs 276 (FIG. 8).

Threaded onto the absorber tensioning bolts are the locking means 90 (FIG. 9) such that half of the unload restraint assemblies are in one direction and the other half are threaded onto the opposite absorber tensioning bolts 74 (FIG. 3) from the other ends, though it is contemplated to install these onto both ends of every absorber tensioning bolt. These absorber tensioning bolts 74 are used to pre-load the absorber 70 to desired tension by tightening the adjustment tool 278 (FIG. 9A) with a wrench. The locking means 90 is then rotated enough for the shoulder bolts 92 to align with the shoulder bolt assembly orifices 27.

Figure 9A:
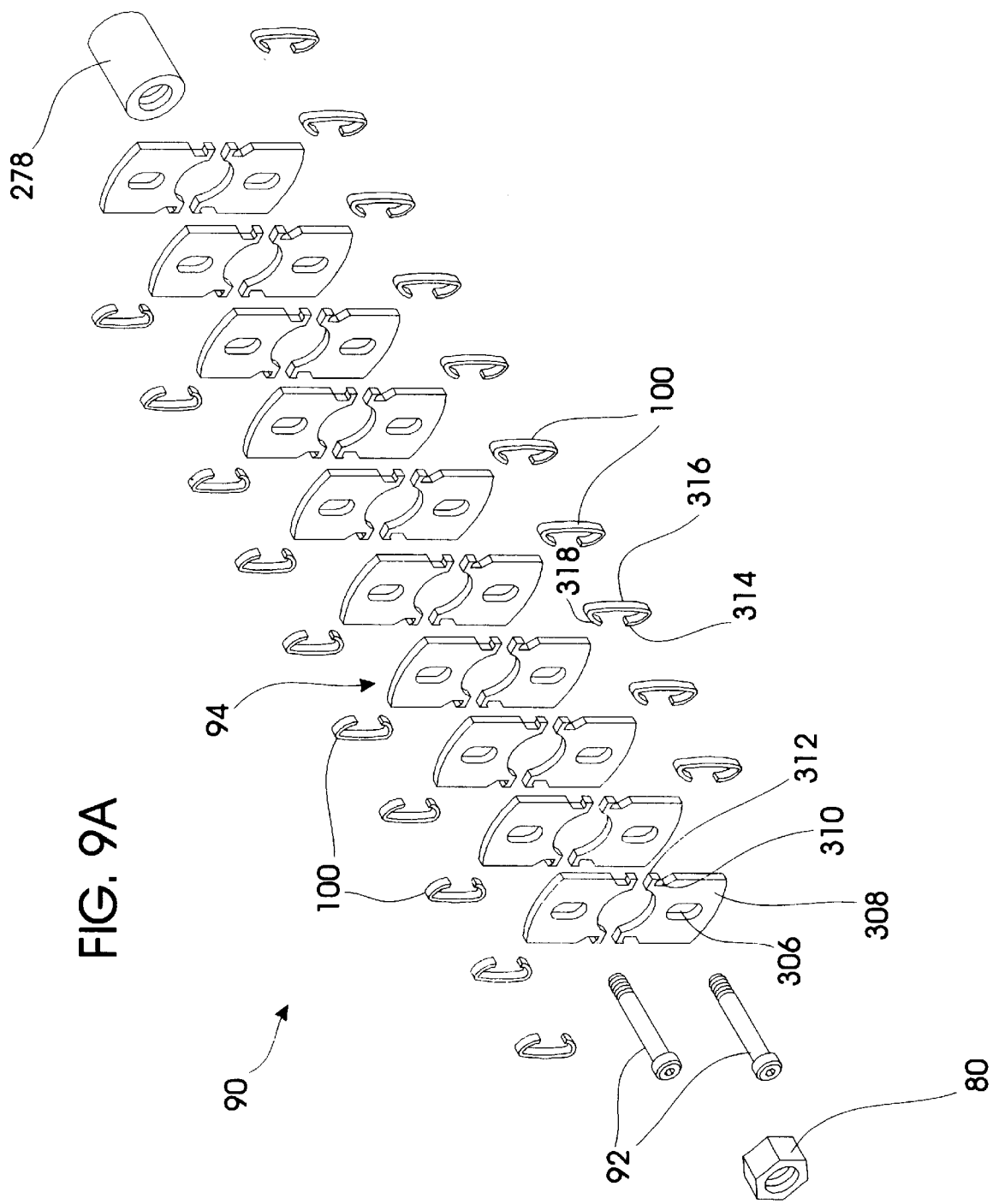
FIG. 9A is an enlarged exploded isometric view of the unload restraint assembly.

The shoulder bolts 92 (FIG. 9A) are sized to tighten snug to the oval mounting slots 306 centered vertically in face 308 but not compressing the upper catch 94 and the lower catch 96 respectively to allow freedom of movement to engage the area between the bolt adjustment 278 and the outboard plates 76 as the progressive shock absorber assembly 70 is compressed. To assure that the upper catches 94 and the lower catches 96 respectively engage when the progressive shock absorber assembly is compressed the C-shaped spring clips 100 with upper tab 318 and lower tab 314 are stretched at back 316 and securely clipped in notch 310 and pressing against wing tab 312 along the opposite edges of the upper catch 94 and the lower catch 96 respectively to form the locking means 90 (FIG. 9A). An identical/matched progressive shock absorber assembly is similarly mounted on the left and right sides of the impact absorbing apparatus 20.

Figure 7:
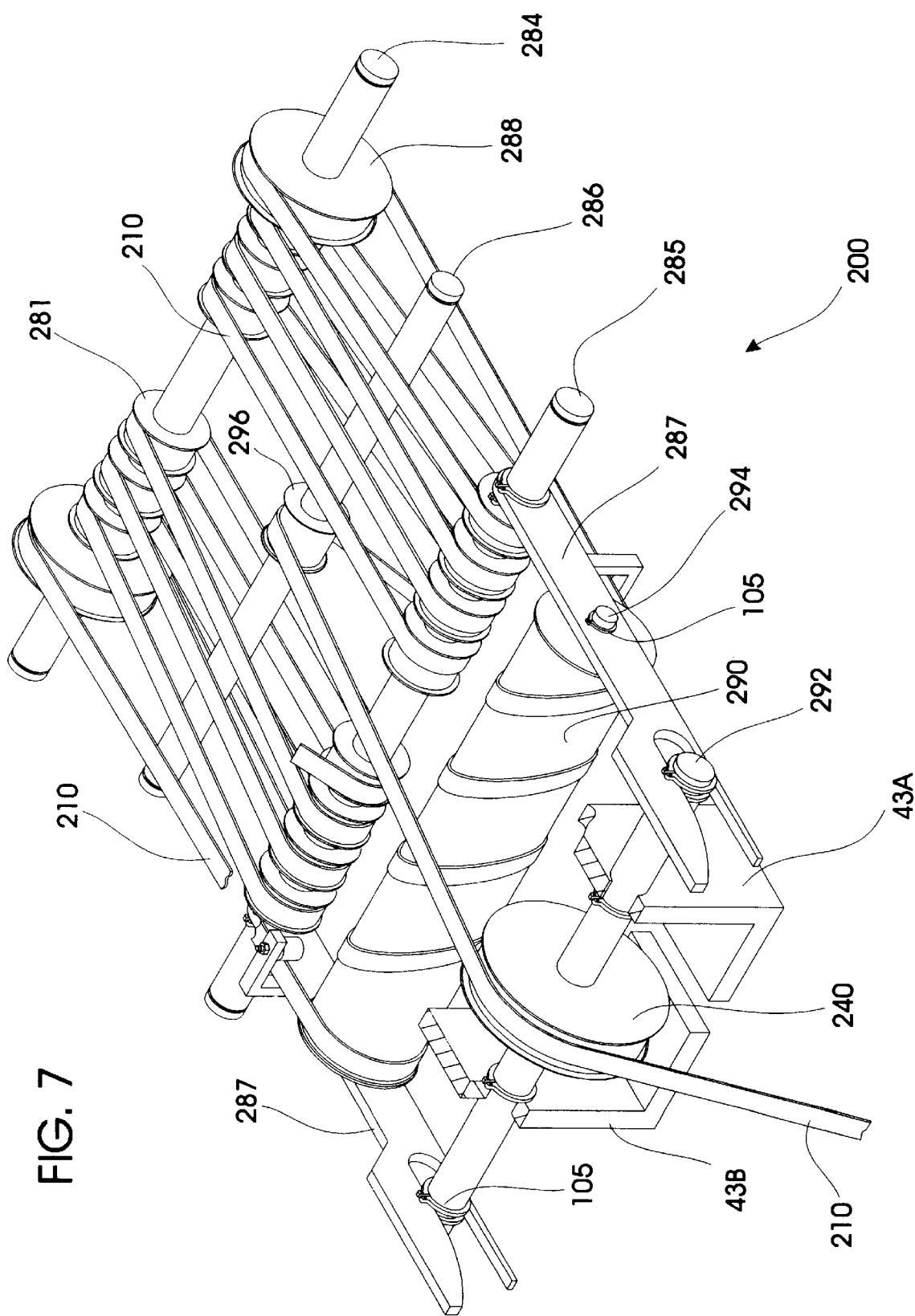
FIG. 7 is a partially fragmented, isometric view of the wound band assembly with portions broken away or omitted for clarity.

The wound band assembly 200 (FIG. 7) is a special block and tackle device to transfer the impact load from the trailer bumper 34 to the trailer 30 through a ratio to reduce the speed imposed on the progressive shock absorber assembly 70, and to reduce the travel distance that the absorbing means 82 and 86 would be exposed. This wound band assembly 200 has an elongated band 210 that attaches chassis 91 by the end plate 220. The band is routed around a number of pulleys 281 mounted on pulley axle 284 to obtain half the desired mechanical advantage. Two pulleys 288 of a diameter larger than pulleys 281 are mounted at opposite ends of pulley axle 284. Axle 284 is pivotally connected to the rear lever means 56, 57, 60, 61 (FIG. 6) through mounting orifices 112 by ring clamp 105. The elongated band 210 then travels to and is wrapped on winding drum 290. Winding drum axle 294 is rotatably coupled to a pair of slidable arms 287. Band 210 is then routed around a similar number of pulleys 281. Front pulley axle 285 is rotatably mounted to the slidable arms 287 and the front lever means 58, 59, 62, and 63, at mounting orifices 112 and secured by ring clamp 105. Band 210 then arrives back near the center where it is routed to spacer pulley 296. Spacer pulley axle 296 is rotatably mounted to ram slide leg 45A and 45B via mounting orifice 47A, 47B (FIG. 10). Band 210 then progresses over guide pulley 240 before going to the end 250 where it is secured to the ram end 252 by end plate 256 with standard mounting hardware 221. Guide pulley axle 292 is rotatably coupled to ram slide arms 42A, 42B.

Figure 2:
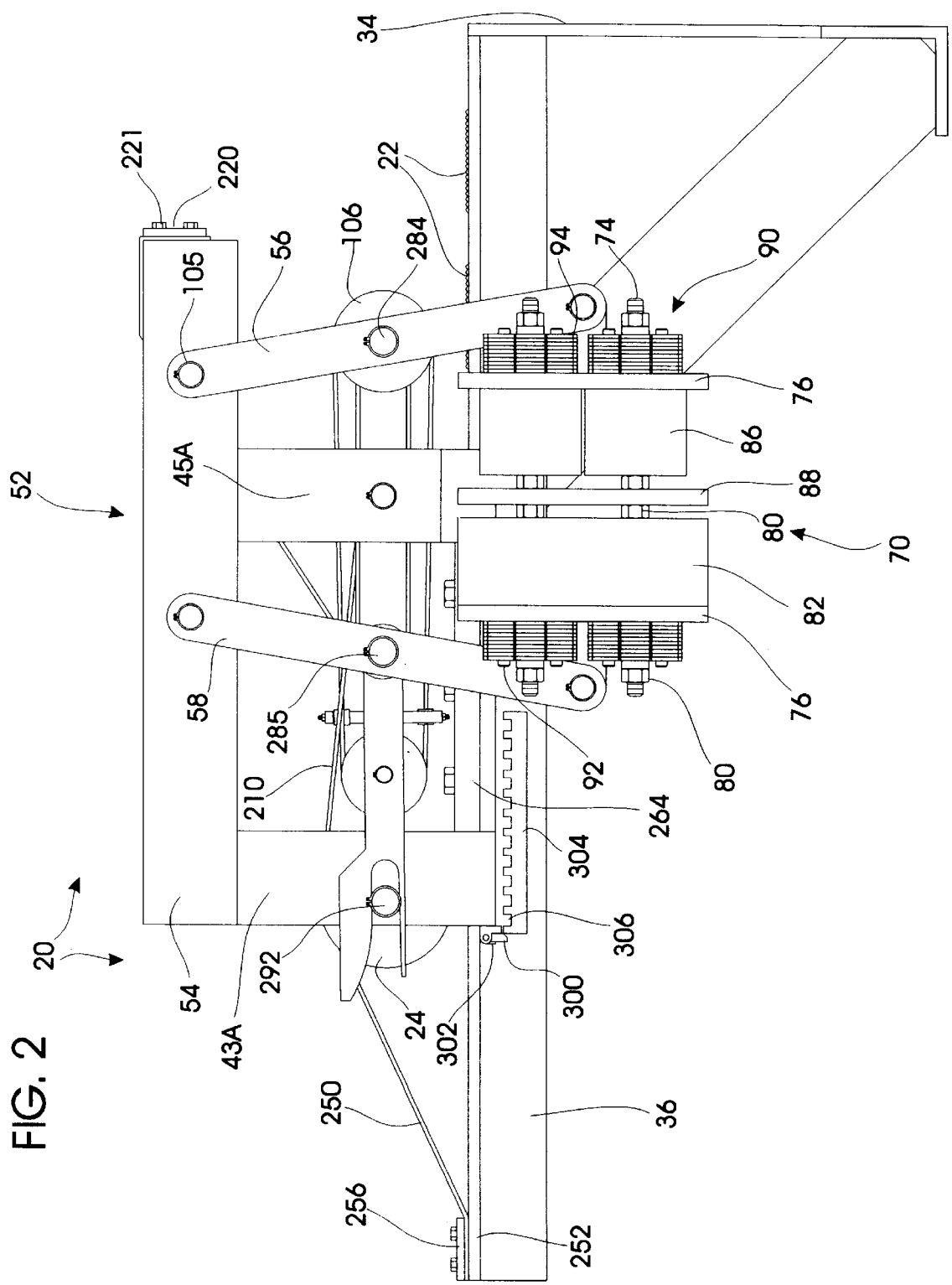
FIG. 2 is a slightly, fragmentary side elevational view.

The ram slide assembly 47 (FIG. 10) is comprised of a pair of spaced apart legs 45A, 45B on one end and a pair of spaced apart arms 43A, 43B on the other end. Legs 45A, 45B are securely coupled to the parallel sides 54 of chassis 52 (FIG. 2). Spacer pulley axle 286 is rotatably contained by orifices 47A, 47B. Arms 43A, 43B are securely mounted to front 53 of the chassis 52. Guide pulley axle 292 is rotatably contained by orifice 49A, 49B such that the containment of the spacer pulley axle 286 and guide pulley axle 292 form a rigid support for the wound band means 200. Ram slide assembly further comprises a top restrictor plate 264 (FIG. 3, 10) adapted to be slidably secured to ram 36. Plate 264 is penetrated along each outside edge by a plurality of mounting orifices 264A, 264B. Legs 45A, 45B are penetrated by threaded orifices 47C adapted to receive and threadably couple bolts 268. Arms 43A, 43B are penetrated by threaded orifices 49C adapted to receive and threadably couple bolts 268. Lower containment plates 270A, 270B are rectangular plates containing several threaded orifices 270C designed to align with the mounting orifices 264A, 264B. The ram assembly 47 thus slidably contains ram 36 under the wound band assembly 200. A rebound preventer ratcheting dog 300 (FIG. 10) is attached to the bottom of 49A and works in conjunction with spring 302 and saw tooth engagement means 304 (FIGS. 1, 2) to assure that any rebounding of the retracted trailer bumper 34 is minimal.

The impact absorbing trailer bumper 34 (FIG. 1) is normally flush with the rear extremity of the trailer 30. The impact absorbing trailer bumper 34 is mounted perpendicular to ram 36 to allow the necessary clearance with the trailer rear axle 40. Ram 36 extends under the trailer 30 parallel with the trailer bed. The bumper 34 is supported primarily by and gets its strength from the ram 36 (FIG. 11). The ram is oriented in a longitudinal direction along the trailer center-line except when more than one unit is required; and/or when the particular trailer application has this space already allocated to other uses and more than one is used to comprormise for available space. The ram 36 is solidly mounted to the trailer bumper 34 with brace 31 (FIG. 1) to assure that the dimensional requirements of the safety standards are met and that clearance with the trailer rear axle 40 is maintained. Ram 36 has friction grid 22 integrally mounted to the bumper end of the ram 36 to provide increased friction between restrictor plate 264 and ram 36.

OPERATION

The operation of my impact absorbing component apparatus for trailer under ride prevention can best be seen in (FIG. 1). The colliding vehicle number 33 at point of impact is also shown with dashed lines after impact as 33A. The trailer bumper number 34 is shown with dashed lines 34A to represent the after impact location as it has been pushed forward with the impact. The ram 36 is shown as 36A in dashed lines to represent the after impact location. Similarly, the visible leg links for support to absorber assembly numbers 56, 58 are shown moved in response to impact tension on the progressive shock absorber assembly apparatus. For clarity of the drawing the small deviation of absorbers were not shown.

As the trailer bumper 34 responds to a colliding force, the ram 36 slides, while contained by the ram slide assembly 47, so that the elongated band 210 of the wound band assembly 200 is extended. Extension of band 210 causes the distance between pulley axles 285 and 284 to decrease pulling the lever arms 56, 58 together thereby compressing the progressive shock absorber 70 in one direction. The ram track assembly 47 (FIG. 10) maintains and directs the ram's 36 travel response to impact. The restricting plate 264 initially has clearance for the ram 36 movement, but as ram 36 slides in response to impact, a friction grid 22 (FIG. 4) contributes to additional function to stop the impacting vehicle and to offer greater resistance to any uncaptured rebound movement. The restricting plate 264 is attached with hardware 268 (FIG. 10).

As compression occurs, absorber tensioning bolts 74 become slack. Then, any further compression adds more slack between the unload restraint assembly 90 and the progressive shock absorber pre-load plate number 76 until the support of the adjustment tool 278 is over come and the locking means 90 engage by clamping the absorber tensioning bolts 74.

The rebound ratcheting dog 300 engages sawtooth gear 304 on the ram 36 in response to the forward movement of the ram 36 during impact. Dog 300 is hingedly mounted to arm 43A with spring 302 to allow one way movement of ram 36. The dog 300 is adapted to lock in the depression 306 of the sawtooth 304 thereby further restricting any rebound of the ram 36.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for absorbing impact forces, said apparatus comprising:
    a chassis adapted to be attached to a vehicle;
    an impact absorbing bumper exposed for contact;
    a displaceable ram projecting from said bumper and slidably captivated by said chassis;
    a wound band assembly activated by said ram;
    lever means driven by said wound band assembly; and,
    shock absorber means activated by said lever means;
    whereby, when said bumper is forcibly impacted, said ran is displaced longitudinally thereby tightening the wound band assembly and causing the levers to compress the shock absorber means.

2. The apparatus as defined in claim 1 wherein said wound band assembly comprises a resilient band, a plurality of axles for supporting said resilient band, said resilient band entrained about the axles and comprising a rear end fixedly terminating at the chassis and a front end terminating at said ram.

3. The apparatus as defined in claim 2 wherein a resilient band, a plurality of axles for supporting said resilient band, said lever means comprises first and second pairs of levers at each side of said chassis, each lever having top ends pivotally coupled to said chassis, intermediate portions pivotally coupled to axles of said wound band assembly, and end portions coupled to said shock absorber means.

4. The apparatus of claim 1 wherein said shock absorber means comprises:
    a rigid front plate;
    a rigid intermediate plate;
    a plurality of radially spaced apart resilient absorbers captivated between said front and intermediate plates;
    a rear plate; and,
    a single large diameter absorber sandwiched between said rear plate and said intermediate plate.

5. The apparatus defined in claim 4 wherein said shock absorber means further comprises:
    first rigid, threaded shaft means having remote ends secured to said front plate and extending towards and through said rearward plate;
    second rigid, threaded shaft means having remote ends secured to said rear plate and extending towards and through said front plate;
    first locking means on said front plate attached to the remote ends of said second shaft means;
    second locking means on said rear plate attached to the remote ends of said first shaft means;
    whereby when the shock absorber means is compressed, and the remote ends of each shaft means are deflected away as the front plate and rear plates are compressed together, the shaft means are clamped by the first or second locking means to prevent the shock absorber means from uncompressing after the initial impact.

6. The apparatus defined in claim 5 wherein said first and second locking means comprises a stack of laminations penetrated by said first and second shaft means and a fastener terminating said first and second shaft means flushly adjacent each stack.

7. The apparatus as defined in claim 6 wherein each lamination comprises a pair of opposed catches and spring means yieldably biasing said catches towards the first and second shaft means, such that, when the front and rear plates are compressed together, the exposed threaded shafts of the first and second shaft means are forcibly captivated by said catches to prevent subsequent uncompressing and rebound.

8. An apparatus for absorbing impact forces, said apparatus comprising:
    a rigid, generally rectangular chassis adapted to be suspended from a vehicle, said chassis comprising a pair of sides, and a front, a rear, and a slide assembly;
    an impact absorbing bumper exposed for contact on said vehicle;
    a displaceable ram projecting from said bumper and captivated by said slide assembly;
    shock absorber means disposed at each side of said apparatus;
    a wound band assembly for dynamically coupling said ram to said shock absorber means;
    lever means for interconnecting said wound band assembly with said shock absorber means;
    whereby, when said bumper is forcibly impacted, said ram is displaced longitudinally thereby tightening the wound band assembly and causing the lever means to compress the shock absorber means.

9. The apparatus as defined in claim 8 wherein said wound band assembly comprises a resilient band, a plurality of axles for supporting said resilient band, said resilient band entrained about the axles and comprising a rear end fixedly terminating at the chassis and a front end terminating at said ram.

10. The apparatus as defined in claim 9 wherein said lever means comprises levers disposed at each side of said chassis, each lever having a top end pivotally coupled to said chassis, an intermediate portions adapted to be pivotally coupled to said wound band assembly, and end portions coupled to said shock absorber means.

11. The apparatus of claim 8 wherein said shock absorber means comprises:

a rigid front plate;

a rigid intermediate plate;

a plurality of radially spaced apart resilient absorbers captivated between said front and intermediate plates;

a rear plate; and, a large diameter absorber sandwiched between said rear plate and said intermediate plate.

12. The apparatus defined in claim 11 wherein said shock absorber means further comprises:

first rigid, threaded shaft means having remote ends secured to said front plate and extending towards and through said rearward plate;

second rigid, threaded shaft means having remote ends secured to said rear plate and extending towards and through said front plate;

first locking means on said front plate attached to the remote ends of said second shaft means;

second locking means on said rear plate attached to the remote ends of said first shaft means;

whereby when the shock absorber means is compressed, and the remote ends of each shaft means are deflected away as the front plate and rear plates are compressed together, the shaft means are clamped by the first or second locking means to prevent the shock absorber means from uncompressing after the initial impact.

13. The apparatus as defined in claim. 8 wherein said ram comprises an anti-rebound ratchet means for preventing the uncontrolled rebound of said ram.

14. The apparatus as defined in claim 13 wherein said anti-rebound ratchet means comprises a saw-toothed track to engage an anti-rebound preventer ratcheting dog.

15. An apparatus for absorbing impact forces, said apparatus comprising:

a mounting system attached to a vehicle;

a chassis suspended from the mounting system, said chassis comprising a slide assembly;

an impact absorbing bumper exposed for contact on said vehicle;

a displaceable ram projecting from said bumper and captivated by said slide assembly for longitudinal movements with respect thereto;

an impact absorbing bumper exposed for contact;

a wound band assembly activated by said ram, said wound band assembly comprising a resilient band, a plurality of axles for supporting said resilient band, said resilient band entrained about the axles and comprising a rear end fixedly terminating at the chassis and a front end connected to said ram;

lever means driven by said wound band assembly; and, shock absorber means compressed by said lever means when impact with said bumper occurs.

16. The apparatus as defined in claim 15 wherein said chassis comprises a pair of spaced apart sides, said lever means comprises first and second a pairs of levers at each side of said chassis, each lever having top ends pivotally coupled to said chassis, intermediate portions adapted to be pivotally coupled to axles of said wound band assembly, and end portions coupled to said shock absorber means.

17. The apparatus of claim 16 wherein said shock absorber means comprises:

a rigid front plate;

a rigid intermediate plate;

a plurality of radially spaced apart resilient absorbers captivated between said front and intermediate plates;

a rear plate; and, a single large diameter absorber sandwiched between said rear plate and said intermediate plate.

18. The apparatus defined in claim 17 wherein said shock absorber means further comprises:

first rigid, threaded shaft means having remote ends secured to said front plate and extending towards and through said rearward plate;

second rigid, threaded shaft means having remote ends secured to said rear plate and extending towards and through said front plate;

first locking means on said front plate attached to the remote ends of said second shaft means;

second locking means on said rear plate attached to the remote ends of said first shaft means;

whereby when the shock absorber means is compressed, and the remote ends of each shaft means are deflected away as the front plate and rear plates are compressed together, the shaft means are clamped by the first or second locking means to prevent the shock absorber means from uncompressing after the initial impact.

19. The apparatus as defined in claim 15 wherein said ram comprises an anti-rebound ratchet means for preventing the uncontrolled rebound of said ram.

20. The apparatus as defined in claim 19 wherein said anti-rebound ratchet means comprises a saw-toothed track to engage an anti-rebound preventer ratcheting dog.

* * * * *